Sept. 5, 1939.  N. M. THOMAS  2,172,183
APPARATUS FOR HARVESTING FROZEN CONFECTIONERY PRODUCTS
Original Filed April 17, 1935
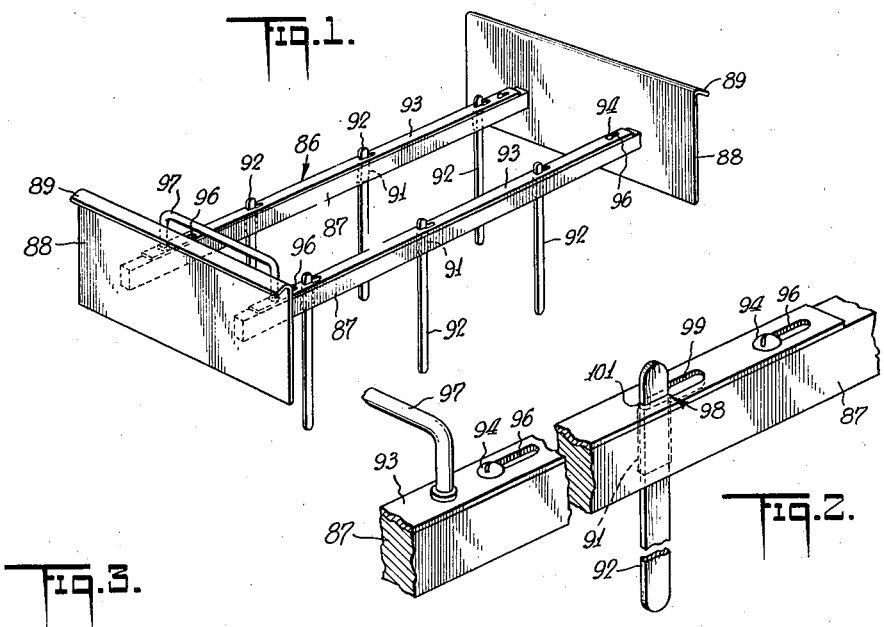
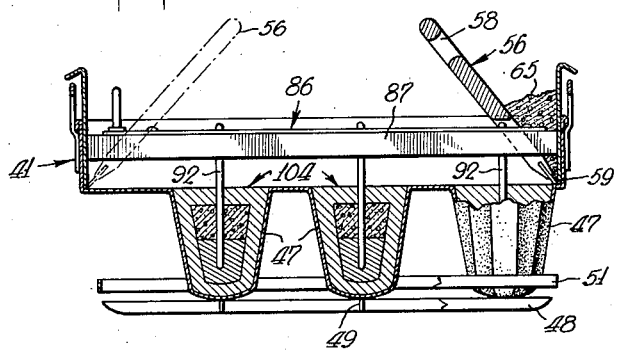
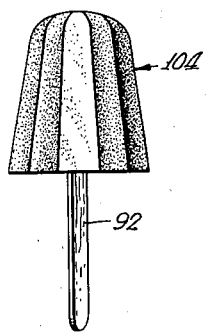
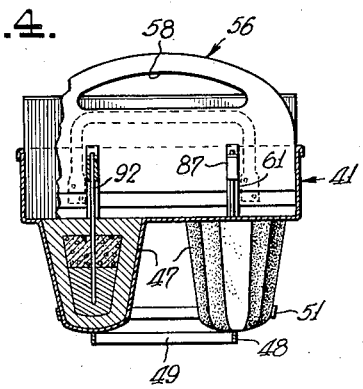
INVENTOR
*Norman M. Thomas*
BY
ATTORNEY Patented Sept. 5, 1939

2,172,183

UNITED STATES PATENT OFFICE 2,172,183

APPARATUS FOR HARVESTING FROZEN CONFECTIONERY PRODUCTS

Norman M. Thomas, Pelham, N. Y., assignor to Joe Lowe Corporation, New York, N. Y., a corporation of Delaware Original application April 17, 1935, Serial No. 16,810, now Patent No. 2,123,215, dated July 12, 1938. Divided and this application April 12, 1938, Serial No. 201,535

3 Claims. (Cl. 294—87)

The present invention relates to apparatus for harvesting a plurality of multi-flavored frozen confections wherein the individual confections are provided with a handle member. The invention has particular relation to new and improved apparatus for making a plurality of such individual composite servings simultaneously in a most efficient, economical and sanitary manner.

This application is a division of my copending application Serial Number 16,810, filed April 17, 1935, now Patent No. 2,123,215.

Heretofore, confectionery products have been made in the form of individual servings consisting of various combinations of flavors and/or substances, but the disadvantages encountered in their manufacture with known methods and apparatus have prevented their production on a large commercial scale. Such confectionery products were made with manual molding methods and refrigerating the materials in an ordinary ice cream plant hardening room, or were formed by a molding operation in which a plurality of hollow centers or openings in said shells were subsequently filled with another kind of substance or with chopped fruits, nuts and the like. These methods, and the apparatus used in conjunction therewith, were very laborious, expensive and unsanitary. The present invention provides apparatus which overcomes the disadvantages of the former methods and apparatus, and permits the manufacture of such individual composite servings with handle members efficiently, cheaply and sanitarily on large scale production.

An object of the present invention is the provision of simple and efficient apparatus, which is highly sanitary and of an inexpensive construction, for simultaneously carrying out the manufacture of a plurality of multi-flavored or composite servings in an economic and efficient manner in accordance with the method described and claimed in my present application Serial No. 16,810, filed April 17, 1938.

Another object of the invention is the provision of a holder by which a plurality of handle stick servings may be manipulated in the manufacture of multi-flavored or composite servings, and by which apparatus the handles may be left in the finished servings at the end of the process of manufacture.

A further object of the invention is to provide a novel and efficient device for removing the excess material from a mold structure containing a plurality of multi-flavored or composite servings after the center portions thereof have been firmly bonded to the handle members locked in the holder and submerged into the coating material in the molds.

Other and further objects and advantages of the invention reside in the detailed construction of the apparatus, which result in simplicity, economy and efficiency, and which will be apparent from the following description, wherein a preferred form of embodiment of the invention is shown, reference being had to the accompanying drawing, forming a part hereof, in which—

Fig. 1 is a perspective view of a holder or peg structure, wherein the pegs are removable wooden handle members adapted to become a part of the completed composite servings;

Fig. 2 is an enlarged, detailed, perspective view of one of the bars of the peg structure shown in Fig. 1, illustrating the manner in which the pegs are removably fastened therein;

Fig. 3 is a longitudinal sectional view, partially in elevation, showing the peg structure of Fig. 1 positioned within its mold structure, and also illustrates the manner in which the excess material is removed by the squeegee from the mold pan;

Fig. 4 is an end view, partially in section, of the apparatus shown in Fig. 3; and Fig. 5 is a perspective view of the composite unitary serving made with the apparatus of my invention, wherein it is provided with a handle member to facilitate eating.

Referring now to the drawing, the peg structure 86 consists of two spaced parallel bars 87 mounted between end plates 88, the upper ends of which are bent outwardly to provide handles 89 for facilitating manipulation of the structure. The bars 87 of the peg structure 86 are provided with a plurality of spaced vertically extending openings 91, which are adapted to receive removable pegs in the form of wooden handle sticks 92. The pegs 92 of the bars 87 are staggered to correspond to the spacing of the mold cavities 47 of the mold structure 41. The pegs 92 are securely fastened in the openings 91 of the bars 87 by movable or slidable bars 93, which are slidably mounted on the tops of the bars 87 by screw bolts 94 operating in longitudinal slots 96. The bars 93 are moved with respect to the bars 87 manually by means of a handle 97 mounted adjacent one end thereof. The bars 93 are provided with a plurality of longitudinal slots 98 having an enlarged portion 99 and a narrow tapering portion 101, the enlarged portion 99 of the slots 98 coinciding with the openings 91 of the bars 87 when the handle 97 is moved to the extreme left, which is its filling and releasing position. When the handle 97 is moved as far as it will go to the right of the peg structure 86, the narrow tapering portion 101 is moved to coincide with the openings 91 of the bars 87, thereby engaging the handle members 92, which have been positioned in said openings 91, and firmly binding them between the bars 87 and the bars 93 by a wedging operation. The pegs 92 may be released from the peg structure 86 by merely moving the handle 97 to the left, which moves the bars 93 a corresponding distance to the left and brings the enlarged portion 99 of the slots 98 over the openings 91 of the bars 87 and at the same time forces the pegs 92 out of the narrow slots 101. The enlarged portion 99 of the slots 98 is too large to engage the pegs 92, and the weight of the serving 104, which is bonded to the lower end thereof, causes the peg 92 to drop out of the peg structure 86. The pegs 92, which are firmly bonded to the servings 104, remain therein and form handles by which they may be manipulated while being eaten.

Since the complete method of making the serving 104 is identical to the method described for making the serving 60 in my co-pending parent application Serial No. 16,810, it is believed unnecessary and inadvisable to repeat the entire process herein.

Although I have not described the making of a chocolate coated or other coated confection, it is obvious that the servings 104 may be coated by merely dipping them in a bath of molten chocolate or other coating material (not shown) while they are held in the peg structure 86.

Although I have only described in detail one modification which my invention may assume, it will be apparent to those skilled in the art that the invention is not so limited, but that various other modifications may be made therein without departing from the spirit thereof or from the scope of the appended claims.

What I claim is:

1. Apparatus of the character described which comprises a main frame structure consisting of a plurality of transversely spaced longitudinally extending main bar members free of intermediate transverse supports, said main bar members having a plurality of longitudinally spaced vertical openings therethrough for receiving handle members, each of said main bar members having a top bar member mounted thereon provided with a series of correspondingly spaced vertical openings therethrough adapted to be registered with the openings of its main bar member, said main bar members and said top bar members being slidably movable with respect to one another, said top bar members being connected transversely adjacent one end for simultaneously moving all of them longitudinally of their main bar members whereby the handle members within said aligned openings are locked therein between said bar members.

2. Apparatus of the character described which comprises a main frame structure consisting of a plurality of transversely spaced longitudinally extending main bar members free of intermediate transverse supports, said main bar members having a plurality of longitudinally spaced vertical openings therethrough for receiving handle members, each of said main bar members having a shorter top bar member slidably mounted thereon provided with a series of correspondingly spaced vertical openings therethrough adapted to be registered with the openings of its main bar member, said shorter top bar member being connected transversely adjacent one end for providing means for simultaneously moving all of them longitudinally of their respective main bar members whereby the handle members positioned within said aligned openings of said bar members are simultaneously secured therein by wedging therebetween.

3. Apparatus of the character described which comprises a main frame structure consisting of a plurality of transversely spaced longitudinally extending main bar members free of intermediate transversely extending supports, said main bar members having a plurality of longitudinally spaced vertical openings therethrough of a size and shape adapted to correspond to the size and shape of the handle member to be positioned therein, each of said main bar members having a shorter top bar member slidably movable longitudinally thereof provided with a series of correspondingly spaced vertical openings therethrough which are elongated longitudinally thereof for permitting movement of the top bar member relative to the handle member projecting from the opening in the main bar member, said shorter top bar members being connected transversely adjacent one end for providing means for simultaneously moving all of them longitudinally of their respective main bar members and the handle members projecting therefrom whereby the latter may be wedgingly locked between the two bar members.

NORMAN M. THOMAS.